US008992884B2

(12) United States Patent
Miller

(10) Patent No.: US 8,992,884 B2
(45) Date of Patent: Mar. 31, 2015

(54) PREPARATION OF X ZEOLITE

(75) Inventor: Stephen J. Miller, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 733 days.

(21) Appl. No.: 12/690,718

(22) Filed: Jan. 20, 2010

(65) Prior Publication Data

US 2011/0176992 A1 Jul. 21, 2011

Related U.S. Application Data

(63) Continuation-in-part of application No. 12/627,921, filed on Nov. 30, 2009, now abandoned.

(51) Int. Cl.
*C01B 39/02* (2006.01)
*C01B 39/22* (2006.01)

(52) U.S. Cl.
CPC ....................................... *C01B 39/22* (2013.01)
USPC .......................................................... 423/700

(58) Field of Classification Search
USPC .................................................. 423/700–718
See application file for complete search history.

(56) References Cited

U.S. PATENT DOCUMENTS

| | | | |
|---|---|---|---|
| 2,882,244 A * | 4/1959 | Milton | 423/718 |
| 3,119,659 A | 1/1964 | Taggart et al. | |
| 3,264,059 A | 8/1966 | McDaniel et al. | |
| 3,338,672 A | 8/1967 | Haden, Jr. et al. | |
| 3,367,886 A | 2/1968 | Haden, Jr. et al. | |
| 3,391,994 A | 7/1968 | Haden, Jr. et al. | |
| 3,594,121 A | 7/1971 | Weber | |
| 3,777,006 A | 12/1973 | Rundell et al. | |
| 3,906,076 A * | 9/1975 | Goytisolo et al. | 423/710 |
| 4,058,586 A | 11/1977 | Chi et al. | |
| 4,381,255 A | 4/1983 | Nozemack et al. | |
| 4,436,708 A | 3/1984 | Sanders | |
| 4,482,530 A | 11/1984 | Sanders et al. | |
| 4,925,613 A | 5/1990 | Harada et al. | |
| 5,053,213 A | 10/1991 | Occelli | |
| 5,558,851 A | 9/1996 | Miller | |
| 5,716,593 A | 2/1998 | Miller | |
| 5,785,944 A | 7/1998 | Miller | |
| 5,785,945 A | 7/1998 | Miller | |
| 6,099,820 A | 8/2000 | Miller | |
| 6,261,534 B1 * | 7/2001 | Miller | 423/700 |
| 6,350,428 B1 * | 2/2002 | Verduijn et al. | 423/702 |
| 7,399,341 B2 * | 7/2008 | Patel et al. | 95/96 |
| 7,837,977 B2 | 11/2010 | Miller | |
| 8,007,764 B2 | 8/2011 | Miller et al. | |
| 8,057,782 B2 | 11/2011 | Miller et al. | |

FOREIGN PATENT DOCUMENTS

| | | |
|---|---|---|
| EP | 1184338 A1 | 3/2002 |
| JP | 57047713 A | 3/1982 |
| JP | 06168375 A | 7/1994 |
| JP | 08208393 A * | 8/1996 |
| JP | 08208393 A | 8/1996 |

OTHER PUBLICATIONS

English translation of JP08208393.*
PCT International Preliminary Report on Patentability Written Opinion, International Application No. PCT/US2010/056719 dated Jun. 5, 2012.
U.S. Appl No. 10/138,061, filed Apr. 30, 2002, abandoned.

* cited by examiner

*Primary Examiner* — Melvin C Mayes
*Assistant Examiner* — Stefanie Cohen
(74) *Attorney, Agent, or Firm* — Michael D. Ross; Joseph P. Foley; Karen R. DiDomenicis

(57) ABSTRACT

A method is disclosed for preparing crystalline aluminosilicate X zeolite from a reaction mixture containing only sufficient water to produce X zeolite. In one embodiment, the reaction mixture is self-supporting and may be shaped if desired. In the method, the reaction mixture is heated at crystallization conditions and in the absence of an added external liquid phase, so that excess liquid need not be removed from the crystallized product prior to drying the crystals.

18 Claims, No Drawings

PREPARATION OF X ZEOLITE

CROSS REFERENCE TO RELATED APPLICATIONS

This application is a Continuation-in-Part of U.S. patent application Ser. No. 12/627,921 filed Nov. 30, 2009, now abandoned, which is incorporated by reference herein in its entirety.

FIELD

The present invention relates to a process for producing crystalline aluminosilicate X zeolite from a reaction mixture which contains only sufficient water to form X zeolite.

BACKGROUND

Prior art methods of preparing crystalline X zeolite typically produce finely divided crystals which must be separated from an excess of liquid in which the zeolite is crystallized. The liquid, in turn, must be treated for reuse or else be discarded, with potentially deleterious environmental consequences. Preparing commercially useful catalytic and/or adsorbent materials which contain the powdered zeolite also normally requires additional binding and forming steps. Typically, the zeolite powder as crystallized must be mixed with a binder material and then formed into shaped particles or agglomerates, using methods such as extruding, agglomeration, spray drying, and the like. These binding and forming steps greatly increase the complexity of manufacture of X zeolite materials. The additional steps may also have an adverse effect on the performance of the X zeolite so bound and formed.

It would be desirable to have an economical method for preparing an X zeolite which would avoid the aforementioned problems and reliably produce an X zeolite. Furthermore, it would be desirable to produce an X zeolite having a high molecular sieve content enabling a high degree of adsorption capacity per unit volume during the use of the zeolite as an adsorbent material.

SUMMARY OF THE INVENTION

According to one embodiment, the invention relates to a method for preparing crystalline X zeolite from a reaction mixture, said method comprising:

(a) preparing a self-supporting reaction mixture comprising at least one active, non-zeolitic source of silica, at least one active, non-zeolitic source of alumina, and a source of hydroxide in amounts sufficient to produce X zeolite, and sufficient water to produce X zeolite; and (b) maintaining said reaction mixture at a temperature of up to about 130° C. under crystallization conditions and in the absence of an added external liquid phase for sufficient time to form crystals of X zeolite.

DETAILED DESCRIPTION OF THE INVENTION

The present disclosure provides a method for preparing crystalline X zeolite which uses a minimum of liquid for crystallization and which minimizes aqueous waste.

The present disclosure provides a method for preparing shaped particles containing X zeolite in the absence of added binder.

The present disclosure provides a method for preparing crystalline X zeolite in the form of a shape, particularly in commercially useful forms without any post crystallization forming steps.

The amount of water present in the reaction mixture as prepared for the crystallization of the zeolite is sufficient to produce the X zeolite. Thus, the reaction mixture itself furnishes all the water needed to crystallize the zeolite. This amount of water is less than the amount of water required in conventional processes for preparing zeolites. It is an amount which is not substantially greater than that required to produce the X zeolite. For example, the amount of water used in the present invention is less than that required to dissolve the reaction mixture components, or, if they are not dissolved, less than that required to immerse the reaction mixture components in the water. Thus, during the crystallization step according to the present process, there is no separate, added external liquid phase present which must be removed from the crystallized material at the end of the crystallization step by, for example filtering or decanting, prior to drying the crystals. This absence of an added external liquid phase distinguishes the present invention from methods for making X zeolite wherein the X zeolite crystals are formed from solution or where solid reactants are heated in an aqueous solution until crystals of X zeolite form.

While it is not a requirement to form the mixture into a shape before the mixture is subjected to crystallization conditions, it may be desired in many cases to do so. In that case, the amount of water present in the reaction mixture is sufficient to form the reaction mixture into a shape, but insufficient to cause the shaped reaction mixture to collapse or "melt" such that it is flowable, i.e., once the reaction mixture is formed into the desired shape containing the desired amount of water, the resulting shape is self-supporting or non-flowable.

Preparing the Reaction Mixture

The reaction mixture from which and in which the X zeolite is crystallized comprises at least one active, non-zeolitic source of silica, at least one active, non-zeolitic source of alumina, and sufficient water to form the X zeolite. This amount of water is considerably less than that required in conventional processes for preparing X zeolite.

The amount of water required in the reaction mixture of the present invention is that amount which is needed to adequately blend the mixture. Thus, a reaction mixture is prepared by mixing water with active sources of the zeolite to form a uniform mass having preferably a heavy paste-like consistency. The active sources will be in a form which can be easily blended into a uniform mass, and may be, for example, powders, hydrated particles, or concentrated aqueous solutions. Sufficient water is added to wet all the powders during the mixing and kneading steps. Alternatively, sufficient water is added that the powders may be kneaded into a uniform and generally homogeneous mixture which may be shaped. It is not necessary that all of the active sources be readily soluble in water during kneading, since the water added to the active sources will be insufficient to make a fluid-like mixture. The amount of water added depends on the mixing apparatus and on the active sources employed. Those familiar with the art can readily determine without undue experimentation the amount of liquid required to properly mix active sources of the zeolite. For example, hydrated sources of the zeolite may require relatively less water, and dried sources may require relatively more. Though it is preferred that the mixture be blended and kneaded until the mixture has a uniform, homogeneous appearance, the length of time devoted to kneading the mixture is not critical in the present process.

The water content of the reaction mixture after blending and kneading may be further adjusted, for example, by drying or by the addition of water. When it desired that the reaction mixture be formed into a shape, adjusting the amount of water can facilitate shaping the reaction mixture and ensure that the mixture will be non-flowable or self-supporting, i.e., the shape will not collapse or "melt" due to an excess of water in the reaction mixture.

Typical non-zeolitic sources of silicon oxide ($SiO_2$) include silicates, silica hydrogel, silicic acid, colloidal silica, fumed silica, tetraalkyl orthosilicates silica hydroxides, precipitated silica and clays. Typical non-zeolitic sources of aluminum oxide ($Al_2O_3$) include aluminates, alumina, and aluminum compounds such as $Al_2(SO_4)_3$, aluminum hydroxide ($AlOH_3$), and kaolin clays. One advantage of the present process is that the sources of silicon oxide and aluminum oxide are all non-zeolitic.

Salts, particularly salts of Group 1 of the Periodic Table, also referred to as alkali metal halides, such as sodium chloride, can be added to the reaction mixture. They are disclosed in the literature as aiding the crystallization of zeolites while preventing silica occlusion in the lattice.

The reaction mixture also contains one or more active sources of oxides of Group 1 of the Periodic Table, also referred to as alkali metal oxides. Sources of lithium, sodium and potassium, are preferred, with sodium especially preferred. Any Group 1 or alkali metal compound which is not detrimental to the crystallization process is suitable here. Non-limiting examples include oxides, hydroxides, nitrates, sulfates, halogenides, oxalates, citrates and acetates. The alkali metal is generally employed in an amount so that the alkali metal/aluminum ratio is at least 1/1, preferably greater than 1/1.

The reaction mixture should contain the following components in the amounts indicated (expressed as mole ratios of oxides even though the starting material may not be an oxide):

$SiO_2/Al_2O_3$=2.5-3.5;

$M^+/SiO_2$=0.5-1.5;

$OH^-/SiO_2$=0.18-0.34; and $H_2O/SiO_2$=3-8;

wherein $M^+$ is an alkali metal cation selected from Group 1 of the Periodic Table.

Forming the Shapes

One advantage of the present process is that the reaction mixture may be formed into a desired shape before the crystallization step, thereby reducing the number of process steps required to prepare catalytic materials containing the resulting zeolite. Prior to forming the reaction mixture, it may be necessary to change the liquid content of the reaction mixture, either by drying or by adding more liquid, in order to provide a formable mass which retains its shape. In general, for most shaping methods, water will generally comprise from about 20 percent to about 60 percent by weight, and preferably from about 30 percent to about 50 percent by weight of the reaction mixture.

The reaction mixture is formed into a shape, e.g., shaped particles. Methods for preparing such shapes are well known in the art, and include, for example, extrusion, granulation, agglomerization and the like. When the shape is in the form of particles, they are preferably of a size and shape desired for the ultimate catalyst or adsorbent, and may be in the form of, for example, extrudates, cylinders, spheres, granules, agglomerates and prills. The particles will generally have a cross sectional diameter between about 1/64 inch (0.040 cm) and about 1/2 inch (1.3 cm), and preferably between about 1/32 inch (0.079 cm) and about 1/4 inch (0.64 cm), i.e., the particles will be of a size to be retained on a 1/64 inch (0.040 cm) and preferably on a 1/32 inch (0.079 cm) screen and will pass through a 1/2 inch (1.3 cm), and preferably through a 1/4 inch (0.64 cm) screen.

The shape prepared from the reaction mixture will contain sufficient water to retain a desired shape. Additional water is not required in the mixture in order to initiate or maintain crystallization within the shaped reaction mixture. Indeed, it may be preferable to remove some of the excess water from the shaped reaction mixture prior to crystallization. Conventional methods for drying wet solids can be used to dry the reaction mixture, and may include, for example drying in air or an inert gas such as nitrogen or helium at temperatures below about 200° C. and at pressures from subatmospheric to about 5 atmospheres pressure.

Naturally occurring clays, e.g., bentonite, kaolin, montmorillonite, sepiolite and attapulgite, are not required, but may be included in the reaction mixture prior to crystallization to provide a product having good crush strength. Such clays can be used in the raw state as originally mined or can be initially subjected to calcination, acid treatment or chemical modification. Microcrystalline cellulose has also been found to improve the physical properties of the particles.

Zeolite Crystallization

According to the present process, the zeolite is crystallized either within the reaction mixture or within the shape made from the reaction mixture. In either case, the composition of the mixture from which the zeolite is crystallized has the molar composition ranges stated above.

It is preferred that the total volatiles content of the reaction mixture during crystallization be in the range of between about 20 wt. % and about 60 wt. %, and preferably between about 30 wt. % and about 60 wt. %, based on the weight of the reaction mixture, where the total volatiles content is the measure of total volatile liquid, including water, in the reaction mixture. It is a feature of the present process that no additional liquid beyond that required to produce the X zeolite is required for zeolite crystallization.

Crystallization of the zeolite takes place in the absence of an added external liquid phase, i.e., in the absence of a liquid phase separate from the reaction mixture. In general, it is not detrimental to the present process if some liquid water is present in contact with the reaction mixture during crystallization, and it can be expected that some water may be on the surface of the reaction mixture during crystallization, or that some water may be expelled from the reaction mixture and may collect on or near the reaction mixture as the reaction progresses. However, it is an objective of the present invention to provide a method of crystallizing the zeolite in such a way as to minimize the amount of water which must be treated and/or discarded following crystallization. To that end, the present method provides a zeolite synthesis method which requires no additional water for crystallization beyond a sufficient amount of liquid required to form the X zeolite.

Once the reaction mixture has been formed, it is preferably "aged" before the X zeolite is crystallized. This aging is accomplished by maintaining the reaction mixture at a relatively low temperature (compared to the crystallization temperature) under conditions which will prevent dehydration of the reaction mixture (such as placing the mixture in a sealed container and/or exposing it to a small amount of water vapor). Thus, the reaction mixture is maintained at room temperature or a slightly higher temperature. Typically, the temperature at which the mixture is aged will be from about 25° C. to about 60° C., even from about 25° C. to about 50° C. This temperature should be maintained for a time sufficient to provide crystalline X zeolite following the crystallization step. It is believed it is within the skill of one skilled in this art to readily determine the length of this aging step without undue experimentation. In general, the aging should be continued long enough to allow X zeolite nuclei to begin to form in the reaction mixture. Typically, though, the aging step will be at least 24 hours.

Crystallization is conducted after the aging step at an elevated temperature and usually in an autoclave so that the reaction mixture is subject to autogenous pressure until the crystals of zeolite are formed. The temperatures during the hydrothermal crystallization step are typically maintained up to about 130° C., even from about 70° C. to about 100° C.

The crystallization is conducted under conditions which will prevent dehydration of the reaction mixture. This may be accomplished by exposing the reaction mixture to a small amount of water vapor or steam during crystallization.

The crystallization time required to form crystals will typically range from about 1 hour to about 10 days, and more frequently from about 3 hours to about 4 days. Under certain circumstances, crystallization times of less than 24 hours are required to prepare crystallized material of high crystallinity. In the present method, the crystallized material collected following the crystallization step will typically comprise at least about 50 weight percent crystals. Crystallized material containing at least about 80 weight percent crystals, and even at least about 90 weight percent crystals, may also be prepared using the present method.

Once the zeolite crystals have formed, the crystals may be water-washed and then dried, e.g., at 90° C. to 150° C. for from 2 to 24 hours. The drying step can be performed at atmospheric or subatmospheric pressures.

Seed Crystals

The zeolite made by the present process is crystallized within the reaction mixture, which comprises amorphous reagents. Crystalline material (i.e., "seed" crystals of X zeolite) may be added to the mixture prior to the crystallization step, and methods for enhancing the crystallization of zeolites by adding "seed" crystals are well known. However, the addition of seed crystals is not a requirement of the present process. Indeed, it is an important feature of the present process that the zeolite can be crystallized within the reaction mixture in the absence of crystals added prior to the crystallization step.

Description of X Zeolite

X zeolite is disclosed in U.S. Pat. No. 2,882,244 which is incorporated herein by reference in its entirety. X zeolite is characterized by a lattice of 3-dimensional channels whose opening is about 7.4 Å. It is generally, but not necessarily, obtained in the sodium form. The powder XRD data for FAU-type molecular sieves prepared herein is known (see, for example, *Collection of Simulated XRD Powder Patterns for Molecular Sieves*, Fifth Edition 2007, M. M. J. Treacy & J. B. Higgins, Elsevier). X zeolite products synthesized by the methods described herein are characterized by their powder X-ray diffraction (XRD) pattern. Minor variations in the diffraction pattern can result from variations in the mole ratios of the framework species of the particular X zeolite sample due to changes in lattice constants. In addition, sufficiently small crystals will affect the shape and intensity of peaks, leading to significant peak broadening. Minor variations in the diffraction pattern can also result from variations in the structure of the organic template used in the zeolites preparation. Calcination can also cause minor shifts in the powder XRD pattern. Notwithstanding these minor perturbations, the basic crystal lattice structure remains unchanged.

The X zeolite produced by the present invention typically has a silica/alumina mole ratio of from about 2.5 to about 3.6, even from about 2.7 to about 3.3. The term "silica/alumina mole ratio" refers to the molar ratio of silicon oxide ($SiO_2$) to aluminum oxide ($Al_2O_3$). Si/Al ratio of the composition is determined from ICP elemental analysis.

Zeolite Crystallite Size

Typically, the zeolite crystals are less than 10 microns in diameter as determined by Scanning Electron Microscopy. Since small crystals are desirable for certain catalytic applications, crystallization conditions can be tailored to produce zeolite crystals with diameters of less than 1.0 micron. The crystal size of the zeolite may be determined by, for example, grinding the shaped particles to separate the individual crystals. High resolution electron micrographs of the separated crystals can then be prepared, after which the average size of individual zeolite crystals can be determined by reference to calibrated length standards. An average crystallite size may then be computed in various well-known ways, including:

$$\text{Number Average} = \frac{\sum_{i=1}^{n}(n_i \times L_i)}{\sum_{i=1}^{n} n_i},$$

where $n_i$ is the number of zeolite crystals where minimum length falls within an interval $L_i$. For purposes of this invention, average crystal size will be defined as a number average. It is important to note that for purposes of the present process, zeolite crystal size is distinguished from what some manufacturers term "zeolite particle size," the latter being the average size of all particles, including both individual crystals and polycrystalline agglomerates, in the as-produced zeolite powder.

Typically, the zeolite crystals are less than 10 microns in diameter as determined by Scanning Electron Microscopy. Since small crystals are desirable for certain catalytic applications, crystallization conditions can be tailored by, for example, reducing crystallization temperature, by increasing aluminum content in the reaction mixture, and/or by reducing the water content of the reaction mixture or the shaped particles prior to crystallization, to produce zeolite crystals with diameters of less than 1.0 micron.

Zeolite Post-Treatment

A crystallized material containing crystals of zeolite is prepared in the process as described above. The zeolite can be used as synthesized or can be thermally treated (calcined). In some cases, the synthesis product can contain silica which is not incorporated in the zeolite structure. This excess silica can be removed by washing with dilute acid (e.g., 0.2M $HNO_3$) or dilute base (e.g., 0.01M $NH_4OH$). This washing should be done prior to thermal treatment of the zeolite. Usually it is desirable to remove the Group 1 metal cation by ion exchange and replace it with hydrogen, ammonium, or any desired metal ion. The zeolite can be used in intimate combination with hydrogenating components, such as tungsten, vanadium, molybdenum, rhenium, nickel, cobalt, chromium, manganese, or a noble metal, such as palladium or platinum, for those applications in which a hydrogenation/dehydrogenation function is desired. Typical replacing cations can include metal cations, e.g., rare earth, Group IA (also referred to as alkali metals), Group IIA (also referred to is alkaline earth metals) and Group VIII metals (namely, iron, cobalt, nickel, ruthenium, rhodium, palladium, osmium, iridium and platinum), as well as their mixtures. Of the replacing metallic cations, cations of metals such as rare earth, Mn, Ca, Mg, Zn, Ga, Cd, Pt, Pd, Ni, Co, Ti, Al, Sn, Fe and Co are particularly preferred.

The hydrogen, ammonium, and metal components can be exchanged into the zeolite. The zeolite can also be impregnated with the metals, or, the metals can be physically intimately admixed with the zeolite using standard methods known to the art. The metals can also be occluded in the crystal lattice by having the desired metals present as ions in the reaction mixture from which the zeolite is prepared.

Typical ion exchange techniques involve contacting the synthetic zeolite with a solution containing a salt of the desired replacing cation or cations. Although a wide variety of salts can be employed, chlorides and other halides, nitrates, and sulfates are particularly preferred. Representative ion exchange techniques are disclosed in a wide variety of patents including U.S. Pat. Nos. 3,140,249; 3,140, 251; and 3,140, 253. Ion exchange can take place either before or after the zeolite is calcined.

Following contact with the salt solution of the desired replacing cation, the zeolite is typically washed with water and subsequently dried at drying temperatures ranging from 65° C. to about 315° C. After washing, the zeolite can be calcined in air or inert gas at temperatures ranging from about 200° C. to 700° C. for periods of time ranging from 1 to 48 hours, or more, to produce a catalytically active product especially useful in hydrocarbon conversion processes.

Regardless of the cations present in the synthesized form of the zeolite, the spatial arrangement of the atoms which form the basic crystal lattice of the zeolite remains essentially unchanged. The exchange of cations has little, if any, effect on the zeolite lattice structures.

The zeolite may be used as a catalyst, without additional forming, if the reaction mixture has been formed into a shape which is of a size and shape desired for the ultimate catalyst. Alternatively, the zeolite can be composited with other materials resistant to the temperatures and other conditions employed in organic conversion processes, using techniques such as spray drying, extrusion, and the like. Such matrix materials include active and inactive materials and synthetic or naturally occurring zeolites as well as inorganic materials such as clays, silica and metal oxides. The latter may occur naturally or may be in the form of gelatinous precipitates, sols, or gels, including mixtures of silica and metal oxides. Use of an active material in conjunction with the synthetic zeolite, i.e., combined with it, tends to improve the conversion and selectivity of the catalyst in certain organic conversion processes. Inactive materials can suitably serve as diluents to control the amount of conversion in a given process so that products can be obtained economically without using other means for controlling the rate of reaction. Frequently, zeolite materials have been incorporated into naturally occurring clays, e.g., bentonite and kaolin. These materials, i.e., clays, oxides, etc., function in part as binders for the catalyst. It is desirable to provide a catalyst having good crush strength, because in petroleum refining the catalyst is often subjected to rough handling. This tends to break the catalyst down into powders which cause problems in processing.

Naturally occurring clays which can be composited with the synthetic zeolite of this invention include the montmorillonite and kaolin families, which families include the sub-bentonites and kaolins commonly known as Dixie, McNamee, Georgia and Florida clays or others in which the main mineral constituent is halloysite, kaolinite, dickite, nacrite, or anauxite. Fibrous clays such as sepiolite and attapulgite can also be used as supports. Such clays can be used in the raw state as originally mined or can be initially subjected to calcination, acid treatment or chemical modification.

In addition to the foregoing materials, the zeolite prepared by the present method can be composited with porous matrix materials and mixtures of matrix materials such as silica, alumina, titania, magnesia, silica-alumina, silica-magnesia, silica-zirconia, silica-thoria, silica-beryllia, silica titania, titania-zirconia as well as ternary compositions such as silica-alumina-thoria, silica-alumina-zirconia, silica-alumina-magnesia and silica-magnesia-zirconia. The matrix can be in the form of a cogel.

The zeolite can also be composited with other zeolites such as synthetic and natural faujasites (e.g., Y), and erionites. They can also be composited with purely synthetic zeolites such as those of the ZSM, SSZ, KU, FU, and NU series. The combination of zeolites can also be composited in a porous inorganic matrix.

In addition to its use as a catalyst, the zeolite prepared by the present method has utility as an adsorbent material. In its sodium form, X zeolite is commonly used in gas purification, including, for example, the removal of sulfur- and nitrogen-containing compounds from gas and for use in air enrichment. Ion-exchanged forms are known for use in liquid separations, including, but not limited to, the removal of water, separation of p-xylene from its isomers, separation of ethylbenzene from its isomers and the separation of fructose from other sugars. As disclosed in U.S. Pat. No. 2,882,244 (Milton), activated zeolite X exhibits a selectivity based on the size and shape of the adsorbate molecule. Among those adsorbate molecules whose size and shape are such as to permit, adsorption by zeolite X, a very strong preference is exhibited toward those that are polar, polarizable, and unsaturated. Another property of zeolite X that contributes to its unique position among adsorbents is that of adsorbing large quantities of adsorbate at very low pressures, at very low partial pressures, or at very low concentrations. One or a combination of one or more of these adsorption characteristics or others makes zeolite X useful for numerous gas or liquid separation processes. The use of zeolite X permits more efficient and more economical operation of numerous processes.

Example 150 g of silica (Hi-Sil 233, a hydrated silica manufacture by PPG) was placed in a Baker-Perkins mixer. 127 g of $NaAlO_2$ dissolved in 350 g of water were added with mixing. Then 45 g of a 50% NaOH aqueous solution was slowly added to the mixer and mixing continued until a paste developed. Steam heat at 160° F. was applied to the jacket of the mixer to dry the mixture slightly until the volatiles content of the mixture was 49 weight percent. The molar composition of the synthesis mix was as follows:

$SiO_2/Al_2O_3=3.0$ $Na^+/SiO_2=0.91$ $OH^-/SiO_2=0.25$ $H_2O/SiO_2=6.6$

The resulting sample of powder was placed in a 1 quart Teflon® bottle with a hole in the cover, and the bottle was sealed in an autoclave which contained 12 cc water outside the bottle to prevent drying of the sample when heated. The bottle was left to age at 35° C. for 24 hours. The bottle was then heated at 80° C. for four days to crystallize the sample.

The sample was washed with deionized water, filtered, dried overnight in a vacuum oven at 120° C., and calcined at 590° C. for four hours. X-ray diffraction analysis (see D. W. Breck, Zeolite Molecular Sieves: Structure, Chemistry, and Use, Robert E. Krieger Publishing Company, 1974) showed the material to be X zeolite having a unit cell constant of 24.90 Å corresponding to a framework silica/alumina mole ratio of 2.7. The unit cell constant was determined from numerous reflexes of the X-ray-diffraction spectrum using cell refinement program with starting value of 24.9 Å (cubic crystal system). The silica/alumina mole ratio of the product zeolite was estimated from a correlation with the unit cell constant (see D. W. Breck, Zeolite Molecular Sieves: Structure, Chemistry, and Use, Robert E. Krieger Publishing Company, 1974, pp. 92-105, 145), specifically the following correlation:

$$a_0 = 192b/(1+N_{Si}/N_{Al}) + c$$

where $a_0$ is the unit cell constant, b is 0.00868, and c is 24.191.

Its X-ray diffraction pattern lines are given in Table I. The powder XRD pattern and data presented herein were collected by standard techniques. The radiation was CuK-α radiation. The peak heights and the positions, as a function of 2θ where θ is the Bragg angle, were read from the relative absolute intensities of the peaks, and d, the interplanar spacing in Angstroms corresponding to the recorded lines, can be calculated.

TABLE I

| 2θ | d | Height | H % |
|---|---|---|---|
| 6.176 | 14.300 | 1678 | 100 |
| 10.043 | 8.801 | 372 | 22 |
| 11.798 | 7.495 | 249 | 15 |
| 15.482 | 5.719 | 460 | 27 |
| 18.481 | 4.797 | 164 | 10 |
| 20.161 | 4.401 | 268 | 16 |
| 22.580 | 3.935 | 117 | 7 |
| 23.417 | 3.796 | 743 | 44 |
| 23.640 | 3.761 | 198 | 12 |
| 26.761 | 3.329 | 663 | 40 |
| 29.321 | 3.044 | 136 | 8 |
| 30.457 | 2.933 | 214 | 13 |
| 31.096 | 2.874 | 546 | 33 |
| 32.100 | 2.786 | 190 | 11 |
| 32.729 | 2.734 | 59 | 3 |
| 33.738 | 2.654 | 238 | 14 |
| 34.284 | 2.613 | 69 | 4 |
| 35.281 | 2.542 | 51 | 3 |
| 37.516 | 2.395 | 136 | 8 |
| 40.100 | 2.247 | 35 | 2 |
| 40.980 | 2.201 | 105 | 6 |
| 41.500 | 2.174 | 81 | 5 |

What is claimed is:

1. A method for preparing crystalline X zeolite from a reaction mixture, said method comprising:
   (a) preparing a self-supporting reaction mixture comprising at least one active, non-zeolitic source of silica, at least one active, non-zeolitic source of alumina, and a source of hydroxide in amounts sufficient to produce X zeolite, and sufficient water to produce X zeolite;
   (b) aging the mixture at a temperature from about 25° C. to about 60° C. for at least 24 hours to form crystals of X zeolite nuclei; and
   (c) maintaining said reaction mixture at a temperature of up to about 130° C. for a period of time from about 1 hour to about 10 days under crystallization conditions and in the absence of an added external liquid phase to form crystals of X zeolite.

2. The method of claim 1 wherein the step (a) occurs in the absence of added binder.

3. The method of claim 1 wherein said reaction mixture has an OH$^-$/SiO$_2$ molar ratio of 0.18 to 0.34.

4. The method of claim 1 wherein said reaction mixture during crystallization has a water/silica molar ratio between about 3 and about 8.

5. The method according to claim 1 wherein said reaction mixture has the following molar composition ranges:

$$SiO_2/Al_2O_3 = 2.5\text{-}3.5;$$

$$M^+/SiO_2 = 0.5\text{-}1.5;$$

$$OH^-/SiO_2 = 0.18\text{-}0.34;$$

$$H_2O/SiO_2 = 3\text{-}8;$$

wherein M$^+$ is an alkali metal cation selected from Group 1 of the Periodic Table.

6. The method according to claim 1 wherein the crystals of X zeolite formed have a silica/alumina mole ratio about 2.5 to about 3.6.

7. The according to claim 6 wherein the silica/alumina mole ratio is from about 2.7 to about 3.3.

8. The method of claim 1 wherein the reaction mixture is extrudable and capable of retaining a shape.

9. A method for preparing crystalline X zeolite from a reaction mixture capable of producing X zeolite, said method comprising:
   (a) preparing a self-supporting reaction mixture comprising at least one active, non-zeolitic source of silica, at least one active, non-zeolitic source of alumina, and a source of hydroxide in amounts sufficient to produce X zeolite, and sufficient water to shape said mixture;
   (b) forming said reaction mixture into a shape;
   (c) aging the shaped mixture at a temperature from about 25° C. to about 60° C. for at least 24 hours to form X zeolite nuclei; and
   (d) maintaining said shaped reaction mixture at a temperature of up to about 130° C. for a period of time from about 1 hour to about 10 days under crystallization conditions and in the absence of an added external liquid phase to form crystals of X zeolite.

10. The method of claim 9 wherein step (a) occurs in the absence of added binder.

11. The method of claim 9 wherein said reaction mixture has an OH$^-$/SiO$_2$ molar ratio of 0.18 to 0.34.

12. The method according to claim 9 wherein said reaction mixture during crystallization has a water/silica molar ratio between about 3 and about 8.

13. The method according to claim 9 wherein said reaction mixture has the following molar composition ranges:

$$SiO_2/Al_2O_3 = 2.5\text{-}3.5;$$

$$M^+/SiO_2 = 0.5\text{-}1.5;$$

$$OH^-/SiO_2 = 0.18\text{-}0.34;$$

$$H_2O/SiO_2 = 3\text{-}8;$$

wherein M$^+$ is an alkali metal cation.

14. The method according to claim 9 wherein the crystals of X zeolite formed have a silica/alumina mole ratio from about 2.5 to about 3.6.

15. The according to claim 9 wherein the silica/alumina mole ratio is from about 2.7 to about 3.3.

16. The method according to claim 9 wherein the shaped crystalline zeolite is a spherical or cylindrical particle having a cross sectional diameter between about 1/64 inch (0.040 cm) and about ½ inch (1.3 cm).

17. The method according to claim 9 wherein the shaped crystalline zeolite is a spherical or cylindrical particle having a cross sectional diameter between about 1/32 inch (0.079 cm) and about ¼ inch (0.64 cm).

18. The method of claim 9 wherein the reaction mixture is extrudable and capable of retaining a shape.

* * * * *